Nov. 14, 1950

J. R. ALMOND ET AL 2,529,533

SOLENOID PLUNGER MECHANISM

Filed Dec. 3, 1945

INVENTORS
JOHN R. ALMOND &
WILLIAM C. BOSWORTH

BY *Louis W. Clement*

ATTORNEY.

Nov. 14, 1950 J. R. ALMOND ET AL 2,529,533
SOLENOID PLUNGER MECHANISM
Filed Dec. 3, 1945 3 Sheets-Sheet 2
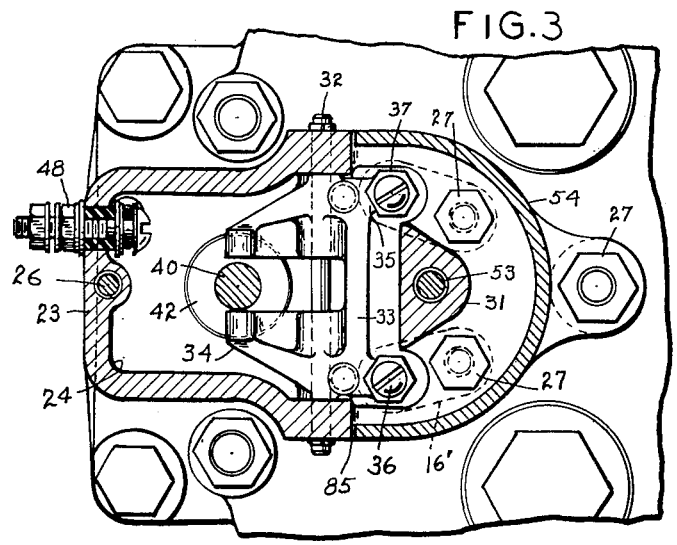
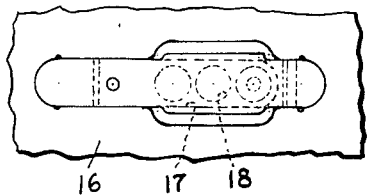
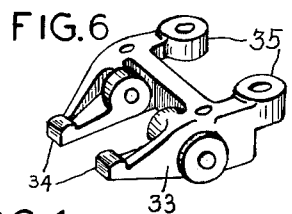
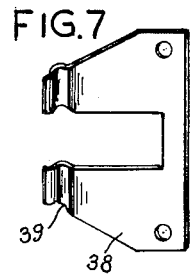
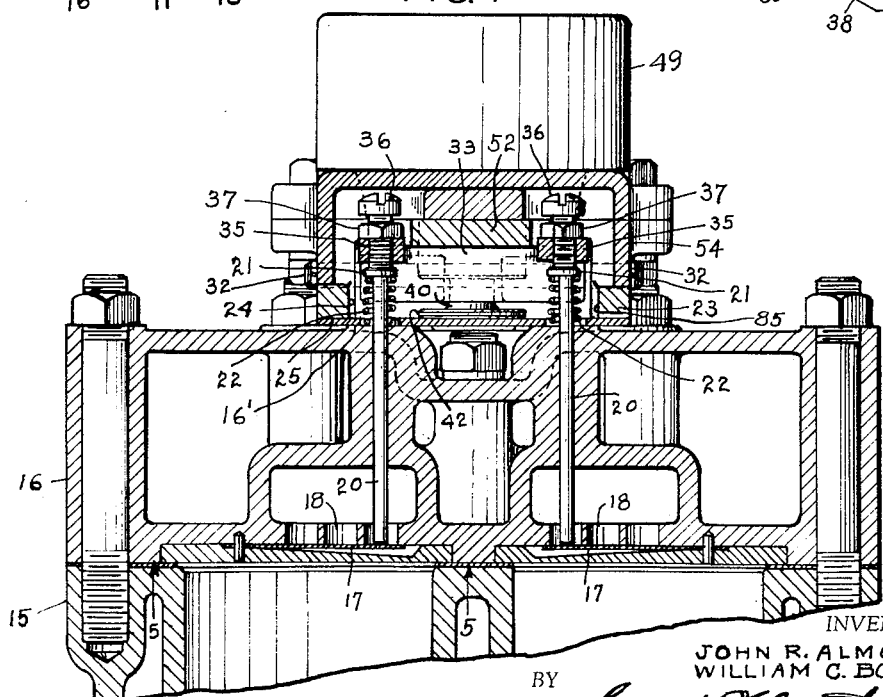
INVENTORS
JOHN R. ALMOND &
WILLIAM C. BOSWORTH.
BY Louis W. Schmidt
ATTORNEY.

Nov. 14, 1950 J. R. ALMOND ET AL 2,529,533
SOLENOID PLUNGER MECHANISM
Filed Dec. 3, 1945 3 Sheets-Sheet 3
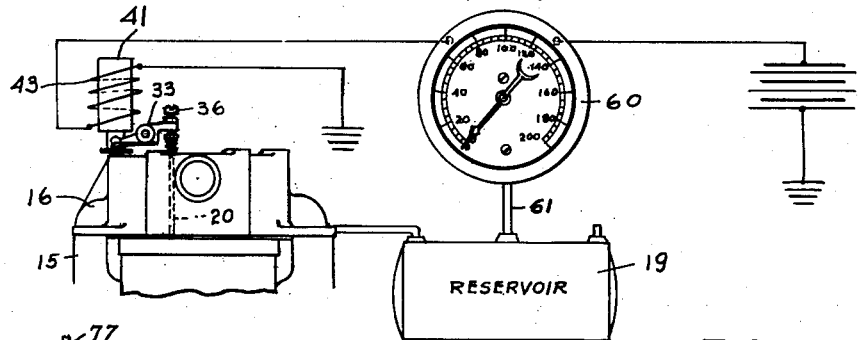
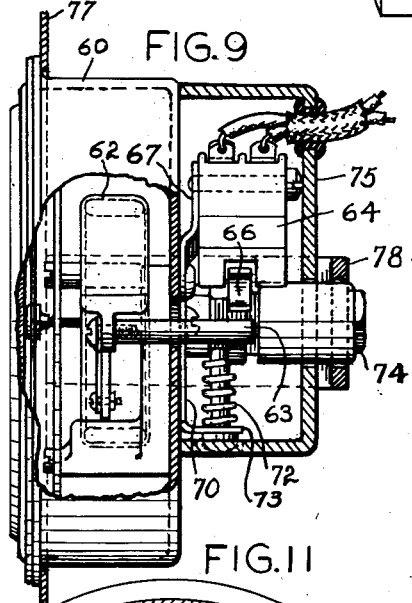
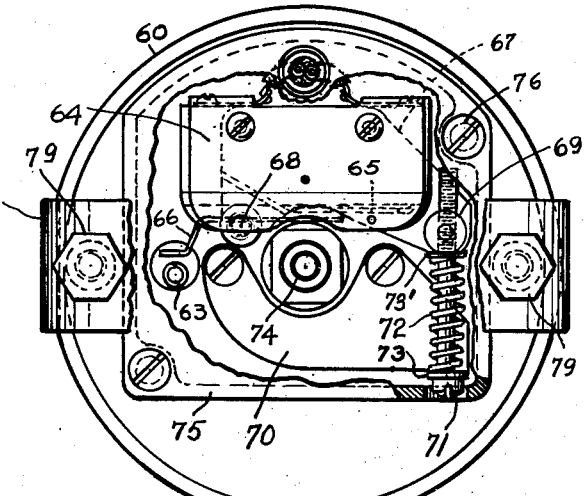
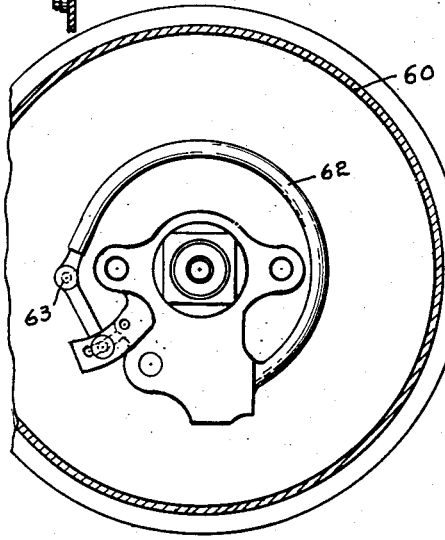
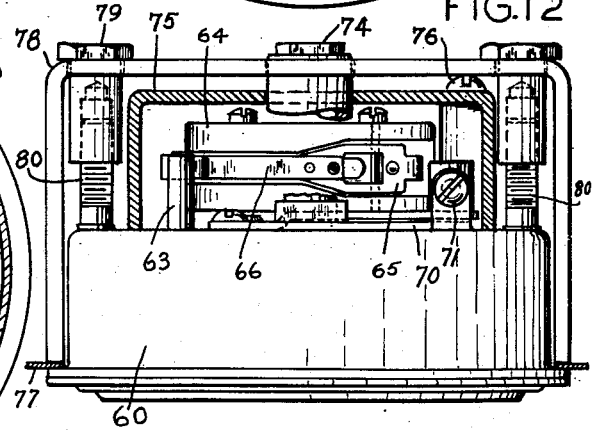
INVENTORS.
JOHN R. ALMOND +
WILLIAM C. BOSWORTH.
BY
ATTORNEY.

Patented Nov. 14, 1950

2,529,533

UNITED STATES PATENT OFFICE 2,529,533

SOLENOID PLUNGER MECHANISM

John R. Almond, Cleveland, and William C. Bosworth, Lakewood, Ohio, assignors to The Midland Steel Products Company, Cleveland, Ohio, a corporation of Ohio Application December 3, 1945, Serial No. 632,582

3 Claims. (Cl. 175—341)

1

This invention relates to new and useful improvements in air compressor governor controls, and an important object of the invention is to provide one which is unaffected by vibration and heat of its environment, and is therefore stable and reliable in operation to effect extremely positive and accurate control of the compressor at all times.

Another object of the invention is to provide means in an actuator for operating the compressor valve whereby no undue strains are imposed upon the valve or operating mechanism in the event of valve sticking or other abnormalities.

A further object of the invention is to provide a control and governor which is sturdy yet highly sensitive and simple in construction and is easily assembled with a compressor and adjusted to various working pressures.

Other objects and advantages of the invention will become apparent during the course of the following description.

In the accompanying drawings forming a part of the application and wherein like numerals are employed to designate like parts throughout the several views.

Fig. 3 is a horizontal section taken on the line 3—3 of Fig. 2,

Fig. 4 is a transverse section taken on the line 4—4 of Fig. 1,

Figure 1:
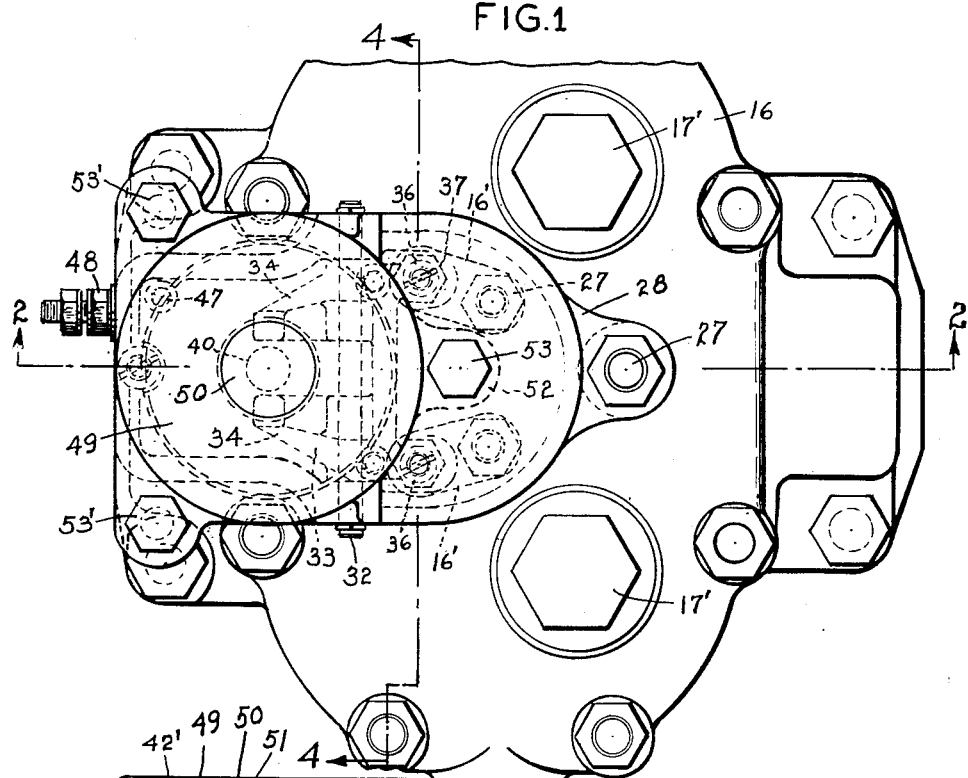
Fig. 1 is a top plan of the governor shown applied to the top of an air compressor.

Fig. 5 is a fragmentary bottom plan of the inlet valve and guard of the compressor, Fig. 6 is a perspective view of the governor rocker, Fig. 7 is a perspective view of the compensating spring for the rocker, Fig. 8 is a schematic view of the governor control system, Fig. 9 is a side elevation of the pressure gauge and electric switch with parts thereof broken away and in section to show the interior construction thereof, Fig. 10 is a rear elevation of the gauge and switch with parts thereof broken away, Fig. 11 is a section taken through the pressure gauge, Fig. 12 is a bottom plan of the gauge with part of the switch casing shown in section to show the construction of the switch.

As a preliminary to an understanding of the invention, it will be understood that a reservoir charged with compressed air from a constantly running compressor, requires unloading of the compressor whenever reservoir pressure reaches a predetermined quantity. Broadly, this invention provides electrical means for causing the compressor to exhaust its compression strokes to the atmosphere whenever the reservoir contains a predetermined pressure.

Referring now more particularly to the drawings and to the sheets containing Figs. 1 to 7 inclusive, the numeral 15 indicates the upper portion of the block of a twin cylinder air compressor such as shown in U. S. Letters Patent 2,199,482, the upper end of which is closed by a removable cylinder head 16, having pads 16' on its upper surface and carrying an inlet valve 17 for each cylinder of the compressor. Each valve 17 is a flat spring adapted to normally seat against air intake ports 18 from the atmosphere upon each compression stroke of the compressor piston, thereby causing compressed air to exit from each cylinder through an outlet valve beneath the plug 17' for each cylinder and to pass to a suitable reservoir indicated by the numeral 19 in Fig. 8. Upon the suction stroke of each piston, its respective inlet valve 17 is caused to flex inwardly and thereby permit atmospheric air to be drawn through the ports 18 into the cylinder. Upon compression stroke, the valve 17 springs and is forced closed against its seat whereby the compressed charge is forced out of the outlet valve 17' to the reservoir. By holding an inlet valve 17 open it will be appreciated that the compressor piston will idly suck atmospheric air into the cylinder and exhaust it back to the atmosphere through the same inlet valve 17. In order to retain these inlet valves open whenever the requisite pressure has been obtained in the reservoir 19, a valve stem 20 is provided for each inlet valve and slidably extends vertically through the compressor head to terminate in a head 21 a substantial distance above the compressor head and is normally retained in such position by a coil spring 22 engaging under the valve stem head 21 as best seen in Fig. 4. Thus, the valve stems 20 are normally retained disengaged from the inlet valves thereby permitting them to function normally to alternately admit and trap air in the cylinder to be compressed and pumped to the reservoir.

Figure 2:
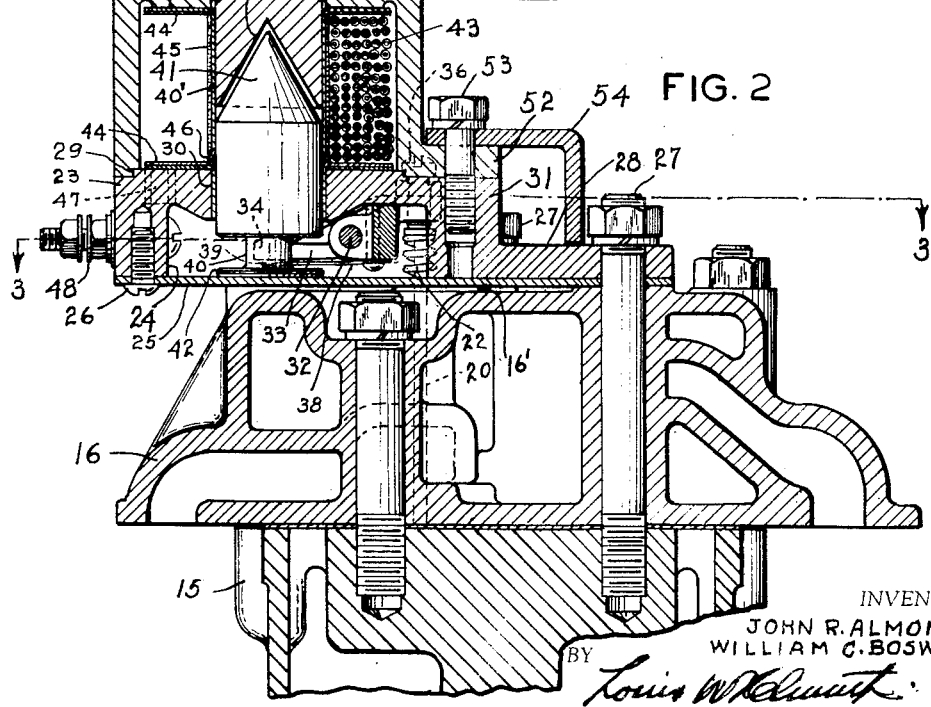
Fig. 2 is a vertical section through the same, taken on the line 2—2 of Fig. 1.

A valve actuator for opening the inlet valves 17 whenever a predetermined pressure is reached in the reservoir, consists of a base 23 having a cavity 24 in its under side closed by a closure plate 25 secured to the base piece by fastening 26 and secured to the pads 16' on top of the compressor head by stud bolts 27 passing through the compressor head and a semi-circular extension 28 of the actuator base. The top side of the base 23 is provided with a raised circular land 29, the center of which has a circular opening entering the cavity 24 as best seen in Figs. 1 and 2. On a line connecting the centers of the bolt 27 and opening 30, the base 23 is projected radially outward of the circular land 29 to form a pedestal 31, on either side of which is an opening or slot 85 through the side wall of the base communicating with the cavity 24.

Within this cavity 24 on a horizontal shaft 32 is fulcrumed a valve actuating rocker arm 33 having a pair of spaced fingers 34 at one side of the shaft, while the other end of the rocker arm is provided with a pair of spaced lugs 35 projecting through the slots or openings 85 in the side wall of the base to be arranged upon opposite sides of the extension 31 immediately above the upper projecting ends of the pair of inlet valve stems 20 of the compressor. Each lug 35 of the rocker arm is provided with a vertical adjusting screw 36 having a lock nut 37 associated therewith to hold its relative adjustment with respect to the rocker arm. Secured to the underside of the rocker arm is a flat spring plate 38 provided with a pair of spaced spring fingers 39 which underlie the fingers 34 of the rocker arm and are normally spaced a distance from the underside thereof as best seen in Fig. 2 and straddle a reduced portion 40 of a cylindrical steel magnetic armature 41. The lower end of this armature is provided with an enlarged head 42 between which and the main body of the armature are disposed the fingers 34 of the rocker arm and the fingers 39 of the stress relieving spring 38.

A brass sleeve 40' has its lower end extending through the opening 30 in the base for slidably guiding the armature 41, while its upper end is flanged as at 42' to provide one end of a bobbin for confining a coil of glass coated wire 43, one end of which is soldered to the brass sleeve. A pair of mica washers 44 are slipped upon the brass sleeve 40 constituting the bobbin in order to confine the solenoid winding, with an asbestos paper sleeve 45 slipped upon the brass sleeve 40 prior to the latter having an annular rib 46 spun outwardly thereon to space the two mica washers 44. The un-grounded end of the solenoid coil is extended through an opening 47 in the base 23 to be connected with a binding post 48.

A cylindrical cover 49 is provided for the solenoid coil and it carries a steel core 50 which projects into the brass sleeve 40 and is provided with a conical cavity 51 in which operates the correspondingly shaped nose of the armature 41. One side of this cover is provided with a laterally projecting base lug 52 which has an aperture aligning with the aperture in the pedestal 31 of the base to receive a screw 53 which passes through a semi-circular cover 54 to hold the same in place above the projecting ends of the rocker arm to exclude extraneous matter from the interior parts of the actuator. Other screws 53' secure the opposite end of the cover to the base. The one screw 53 secures both the solenoid housing 49 and the housing 54 to the base of the valve actuator.

It will be apparent that when the coil 43 is deenergized the armature 41 will be in its normal position shown in Fig. 2, being urged into that position by gravity and the coil springs 22 of the valve stems 20 tilting the rocker arm in a counter-clockwise direction. Upon energization of the solenoid, the armature 41 is drawn toward the core piece 50 thereby moving the rocker arm 33 clockwise causing a depression of the valve stems 20 to force the inlet valves 17 from their seats so that the compressor will exhaust the charges from the cylinders upon compression strokes of the pistons. In both movements of the rocker arm, it will be obvious that the compensating spring 38 will relieve any strains placed upon the movable parts to prevent breakage or serious damage.

In order to limit the pressure in reservoir 19 by controlling the operation of the compressor, a standard air pressure gauge 60 of the Bourdon type is connected to the reservoir by a pipe 61. This gauge includes the usual expanding and contracting tube 62, one end of which is connected with a bodily movable pin 63 extending through and beyond the case of the gauge to operate a circuit maker and breaker 64 for controlling the operation of the solenoid 43. This circuit maker and breaker is the well known snap action type of switch having a pivoted contact 65 to open and close the circuit and which is operated by a pivoted arm 66 arranged with one end in the path of movement of the air gauge pin 63 to open and close a circuit including a source of current and the solenoid 43. This switch 64 is mounted on an adjusting arm 67 fulcrumed at 68 having its free end provided with a swiveled nut 69. A bracket 70 fixed to the back of the pressure gauge, has a lateral extension 73 beneath the nut 69 for the passage of an adjusting screw 71 threaded through the nut 69 so that the switch casing 64 can be swung on its fulcrum 68 by rotation of the screw to adjust the distance between the switch operating arm 66 and the pin 63 of the gauge so as to cause the switch to be operated with precision when the gauge registers the amount of pressure desired to be maintained in the reservoir 19. A coil spring 72 is positioned upon the adjusting screw 71 to press a slidable washer 73 beneath the nut 69 and maintain desired tension on the adjustment. Fluid medium pressure is transmitted to the Bourdon tube 62 through a conduit 74 which extends into the center of the air gauge case between the bracket 70 and the adjusting arm 67. A suitable casing 75 encloses the switch mechanism on back of the pressure gauge and is held in position by screws 76 passing into the back of the pressure gauge. The pressure gauge is clamped upon the edges of an opening in a suitable support 77 or dash board of a vehicle, with the flange of the gauge engaging the front of the support while a U-shaped strap 78 embraces the gauge and switch and is fastened to the back of the gauge by means of the nuts 79 engaging threaded studs 80 extending from the rear side of the pressure gauge as best seen in Fig. 12. As the electrical valve actuator is mounted directly on top of the compressor and frequently near some hot spot around an internal combustion engine, it is important that the electrical portion of the equipment be well insulated against heat. For this reason the winding 43 and its leads are glass, mica or lava coated, and sufficient insulation 44 and 45 and ample housing are provided for preventing the detrimental effects of heat upon the solenoid winding.

From the foregoing description, the operation of the governor control will be readily apparent, and it is to be understood that various changes in the shape and arrangement of parts may be resorted to without departing from the spirit of the invention.

We claim:

1. Valve control mechanism comprising a solenoid winding, a solenoid armature having a groove in the end thereof outside of said winding, a lever fulcrumed between its ends and having two arms, the first of said arms extending into said groove and engaging the inner side thereof, resilient means in said groove and engaging the outer side thereof, mechanical means engageable with and actuatable by the second of said arms, resilient biasing means constantly urging said mechanical means against said second arm and the first arm away from said inner side of the groove, said resilient means serving to transmit to the lever motion of the solenoid armature in opposition to the urging of said biasing means upon energization of the solenoid winding and serving to transmit to the solenoid armature motion of the lever under the urging of said biasing means upon de-energization of said solenoid winding.

2. Valve control mechanism comprising a solenoid winding, a solenoid armature having a groove in the end thereof outside of said winding, a lever fulcrumed between its ends and having two arms, the first of said arms extending into said groove and engaging the inner side thereof, resilient means in said groove, connected to said lever and engaging the outer side of said groove, mechanical means engageable with and actuatable by the second of said arms, resilient biasing means constantly urging said mechanical means against said second arm and the first arm away from said inner side of the groove, said resilient means serving to transmit to the lever motion of the solenoid armature in opposition to the urging of said biasing means upon energization of the solenoid winding and serving to transmit to the solenoid armature motion of the lever under the urging of said biasing means upon de-energization of said solenoid winding.

3. Valve control mechanism comprising a solenoid winding, a solenoid armature having a groove in the end thereof outside of said winding, a lever fulcrumed between its ends and having two arms, the first of said arms extending into said groove and engaging the inner side thereof, and a leaf spring connected to the lever outside of the groove, extending along the first of said arms into and engaging the outer side of said groove, mechanical means engageable with and actuatable by the second of said arms, resilient biasing means constantly urging said mechanical means against said second arm and the first arm away from said inner side of the groove, said leaf spring serving to transmit to the lever motion of the solenoid armature in opposition to the urging of said biasing means upon energization of the solenoid winding and serving to transmit to the solenoid armature motion of the lever under the urging of said biasing means upon de-energization of said solenoid winding.

JOHN R. ALMOND.
WILLIAM C. BOSWORTH.

REFERENCES CITED

The following references are of record in the file of this patent:

UNITED STATES PATENTS

| Number | Name | Date |
|---|---|---|
| Re. 21,497 | Trombetta | June 25, 1940 |
| 675,865 | Starr | June 4, 1901 |
| 745,926 | Sundh | Dec. 1, 1903 |
| 816,869 | Magnuson | Apr. 3, 1906 |
| 858,468 | Richards | July 2, 1907 |
| 858,470 | Richards | July 2, 1907 |
| 1,024,785 | Johnson | Apr. 30, 1912 |
| 1,072,576 | Conrader | Sept. 9, 1913 |
| 1,259,172 | Turbayne | Mar. 12, 1918 |
| 1,383,432 | Simon | July 5, 1921 |
| 1,597,650 | Federle | Aug. 24, 1926 |
| 1,655,003 | Woodford | Jan. 3, 1928 |
| 1,683,624 | Murphy | Sept. 11, 1928 |
| 1,806,925 | Trapper | May 26, 1931 |
| 1,904,943 | Apple et al. | Apr. 18, 1933 |
| 2,155,358 | Cyr | Apr. 18, 1939 |
| 2,234,488 | Dick | Mar. 11, 1941 |
| 2,336,887 | Piron | Dec. 14, 1943 |
| 2,360,945 | Garner | Oct. 24, 1944 |
| 2,365,826 | Landon | Dec. 26, 1944 |
| 2,411,800 | Nardone | Nov. 26, 1946 |

FOREIGN PATENTS

| Number | Country | Date |
|---|---|---|
| 572,091 | Germany | Feb. 23, 1933 |